(12) United States Patent
Manji et al.

(10) Patent No.: US 10,933,911 B2
(45) Date of Patent: Mar. 2, 2021

(54) ELECTRIC WORK VEHICLE

(71) Applicant: Kubota Corporation, Osaka (JP)

(72) Inventors: Yasuhiro Manji, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 105 days.

(21) Appl. No.: 16/004,870

(22) Filed: Jun. 11, 2018

(65) Prior Publication Data

US 2019/0176884 A1    Jun. 13, 2019

(30) Foreign Application Priority Data

Dec. 12, 2017   (JP) .............................. JP2017-237636

(51) Int. Cl.
| | | |
|---|---|---|
| *B62D 6/10* | (2006.01) | |
| *B62D 5/04* | (2006.01) | |
| *B62D 7/00* | (2006.01) | |
| *B60K 7/00* | (2006.01) | |
| *B62D 11/04* | (2006.01) | |
| *B62D 11/00* | (2006.01) | |

(52) U.S. Cl.
CPC .............. *B62D 6/10* (2013.01); *B60K 7/0007* (2013.01); *B62D 5/046* (2013.01); *B62D 11/003* (2013.01); *B62D 11/04* (2013.01); *B60K 2007/0061* (2013.01)

(58) Field of Classification Search
CPC ........ B62D 6/10; B62D 5/046; B62D 11/003; B62D 11/04; B60K 7/0007
USPC ....................................................... 180/6.5
See application file for complete search history.

(56) References Cited

U.S. PATENT DOCUMENTS

| 6,672,412 | B1 | 1/2004 | Charlson | |
|---|---|---|---|---|
| 2011/0127093 | A1* | 6/2011 | Koga | B62D 11/003 180/6.24 |
| 2014/0059989 | A1* | 3/2014 | Ishii | A01D 34/64 56/10.2 A |
| 2017/0120755 | A1* | 5/2017 | Ito | B60L 3/10 |
| 2018/0297585 | A1* | 10/2018 | Lian | B60L 3/102 |

FOREIGN PATENT DOCUMENTS

| EP | 2327607 A2 | 6/2011 |
|---|---|---|
| JP | 2014117026 A | 6/2014 |
| JP | 2016163459 A | 9/2016 |

\* cited by examiner

*Primary Examiner* — Jacob D Knutson
(74) *Attorney, Agent, or Firm* — The Webb Law Firm

(57) ABSTRACT

An electric work vehicle of the present invention includes a left drive wheel and a right drive wheel that are supported to a vehicle body, a left motor that drives the left drive wheel and a right motor that drives the right drive wheel, a traveling motor control unit that controls the left motor and the right motor independently based on steering signals from a steering unit, and a turn response enhancement unit. The turn response enhancement unit gives, to the traveling motor control unit, additional control amounts for the left motor and the right motor so as to improve turning response during turning of the vehicle body.

6 Claims, 7 Drawing Sheets

ELECTRIC WORK VEHICLE

CROSS-REFERENCE TO RELATED APPLICATION

This application claims priority to Japanese Patent Application No. 2017-237636 filed Dec. 12, 2017, the disclosure of which is hereby incorporated in its entirety by reference.

BACKGROUND OF THE INVENTION

Field of the Invention

The present invention relates to an electric work vehicle that includes a left motor for driving a left drive wheel, a right motor for driving a right drive wheel, and a traveling motor control unit that controls the left motor and the right motor independently based on a steering signal from a steering unit.

Description of Related Art

In a motor driven vehicle (lawn mower) disclosed in JP 2014-117026A, left and right traveling motors respond to forward-rearward swinging of left and right steering levers that respectively correspond to the left and right traveling motors, the traveling motors rotate in accordance with the swing direction (forward or rearward), and steering is performed by differences between the speeds of the left and right traveling motors. At this time, an overload determination is made based on the difference between target rotation speeds and the actual rotation speeds of the left and right traveling motors, and if it is determined that overload is occurring, the target rotation speed or the target torque is changed by reducing the target rotation speeds of the traveling motor that are used normally (when an overload is not occurring), which are calculated based on the swing positions of the steering levers.

The ability to make agile turns is a feature of vehicles in which the vehicle body is turned (steered) by differences in the speeds of left and right wheels that are driven independently, such as the motor driven vehicle disclosed in JP 2014-117026A. However, there is a problem that the turning operations feel sluggish to the driver even if the traveling motors are controlled with an inverter or the like based on steering signals from the steering levers. If the control sensitivity is raised in order to avoid this problem, a problem arises in that the vehicle body tends to deviate during straight traveling.

In light of this situation, there is demand for an electric work vehicle that can achieve both steering stability during straight traveling and agile turning ability during turning.

SUMMARY OF THE INVENTION

An electric work vehicle according to one aspect of the present invention includes: a vehicle body; a left drive wheel and a right drive wheel that are supported to the vehicle body; a left motor configured to drive the left drive wheel and a right motor configured to drive the right drive wheel; a steering unit configured to steer the vehicle body; a traveling motor control unit configured to control the left motor and the right motor independently based on a steering signal from the steering unit; and a turn response enhancement unit configured to give, to the traveling motor control unit, an additional control amount for the left motor and the right motor so as to improve turning response during turning of the vehicle body.

According to this configuration, if a request for turning the vehicle body is detected based on the steering signals from the steering unit, the left motor and the right motor are enhanced with the additional control amount so as to improve the turning response. As a result, during turning, the left motor and the right motor are driven with speed characteristics or torque characteristics that are different from when straight traveling control is performed. Accordingly, the electric work vehicle of the present invention obtains steering stability during straight traveling and agile turning ability during turning.

In a preferred aspect of the present invention, the electric work vehicle further includes: a left motor speed instruction calculation unit configured to calculate a left motor speed instruction from the steering signal and a right motor speed instruction calculation unit configured to calculate a right motor speed instruction from the steering signal, wherein the traveling motor control unit outputs a left motor control instruction and a right motor control instruction that are generated based on the left motor speed instruction and the right motor speed instruction, and the turn response enhancement unit outputs a left additional instruction for enhancing the left motor control instruction and a right additional instruction for enhancing the right motor control instruction, based on a turn instruction calculated based on the left motor speed instruction and the right motor speed instruction. According to this configuration, the generation of basic control instructions for the left and right motors and the controlling of the rotation of the left and right motors are performed based on the left and right motor speed instructions that are calculated according to steering operations performed by the driver. A turn instruction is calculated if the speed instruction values (speed values) for the left motor and the right motor are different, that is to say if a turn is intended. Based on this turn instruction, the turn response enhancement unit outputs left and right additional instructions for additionally applying, to the left and right motors, current or torque that is necessary for realizing agile turning. Specifically, in comparison to straight traveling in which the left and right motors are driven according to basic control instructions used conventionally, current or torque is added during turning, thus realizing agile turning that has not been conventionally possible.

In a more specific aspect, the turn response enhancement unit generates the left additional instruction and the right additional instruction based on a torque instruction calculated based on a turning angular speed calculated from the turn instruction and an actual turning angular speed calculated from a detection signal from an angular speed sensor. According to this configuration, a target turning angular speed is calculated from the turn instruction, a torque instruction is calculated from the turning angular speed (target turning angular speed) and the actually occurring turning angular speed (actual turning angular speed), and left and right additional instructions are generated based on the torque instruction. Accordingly, during turning, the driver can drive the vehicle with a feeling of more sensitive steerability than during straight traveling.

In another preferred aspect, the turn response enhancement unit calculates a turning angular acceleration from the turning angular speed and the actual turning angular speed, and calculates the torque instruction from the turning angular acceleration. According to this configuration, a turning angular acceleration is also calculated from the target turning angular speed, a torque instruction is calculated from the turning angular acceleration (target turning angular acceleration) and the actual turning angular acceleration calculated based on the actual turning angular speed, and left and right additional instructions are generated based on the torque instruction. In other words, the torque instruction has been calculated based on the angular acceleration, and therefore turning having superior agility can be performed by generating left and right additional instructions by calculating the torque instruction based on the speed (angular speed).

In another preferred aspect of the present invention, the turn response enhancement unit calculates an auxiliary torque instruction from the turning angular speed and the actual turning angular speed, and the auxiliary torque instruction is added to the torque instruction. The left and right additional instructions are generated from the torque instruction that was adjusted with the auxiliary torque instruction, thus making it possible to obtain more appropriate turning ability.

Note that an increase in processing speed is essential to realizing agile turning with use of the turn response enhancement unit. Moreover, in order to achieve this increase in processing speed at a low cost, in a preferred aspect of the present invention, the turn response enhancement unit includes a lookup table that derives the left additional instruction and the right additional instruction based on the turn instruction. Experimentation is repeated in advance, and the lookup table is created so as to derive, from the turn instruction, left and right additional instructions that generate turning such that there is no sense of incongruity between steering operations and the turning sensation during turning. Accordingly, it is possible to realize swift turning control at a low cost.

DESCRIPTION OF THE INVENTION

The following describes a specific embodiment of an electric work vehicle according to the present invention with reference to the drawings. In this embodiment, the electric work vehicle is a mid-mount electric mowing machine. Note that in the present specification, unless particularly stated otherwise, "front" refers to the front side in the vehicle body front-rear direction (traveling direction), and "rear" refers to the rear side in the vehicle body front-rear direction (traveling direction). Also, the left-right direction and the horizontal direction refer to the chassis transverse direction (chassis width direction) that is orthogonal to the vehicle body front-rear direction. Moreover, "upper" and "lower" are in a positional relationship with respect to the vertical direction (perpendicular direction) of the vehicle body, and refer to a relationship in terms height above the ground.

Figure 1:
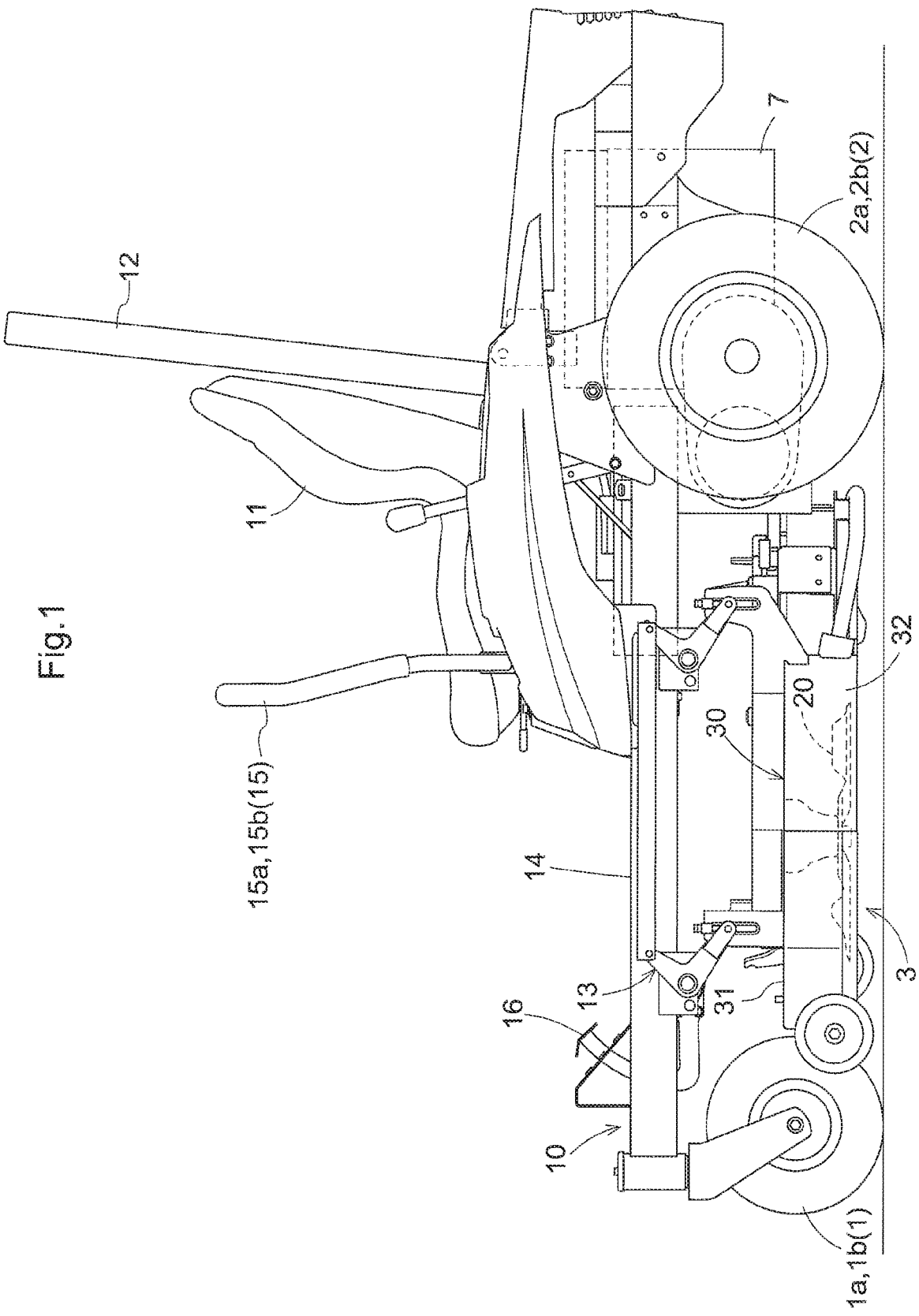
FIG. 1 is a side view of a mid-mount riding-type electric mowing machine that is one example of an electric work vehicle according to the present invention.

FIG. 1 is a side view of the electric mowing machine (simply referred to hereinafter as "mowing machine"). This mowing machine includes a front wheel unit 1 that has a rotatable caster-type left front wheel 1a and right front wheel 1b, a drive wheel unit 2 that has a left drive wheel 2a and a right drive wheel 2b, a frame-shaped vehicle body 10 that is supported by the front wheel unit 1 and the drive wheel unit 2, a battery 7 that is arranged in the rear portion of the vehicle body 10, a driver seat 11 that is arranged in front of the battery 7, a roll protection frame 12 provided upright rearward of the driver seat 11, and a mower unit 3 that is elevatably suspended from the vehicle body 10 via an elevating link mechanism 13 in an underside space of the vehicle body 10 between the front wheel unit 1 and the drive wheel unit 2.

A floor plate 14, which is a footrest for the driver, is provided in front of the driver seat 11, and a brake pedal 16 projects from the floor plate 14. A steering unit 15 is for steering the vehicle body 10 and includes a left steering lever 15a and a right steering lever 15b that are arranged on respective sides of the driver seat 11 and swing about a horizontal swing axis that extends in the vehicle body transverse direction. The rotation speed of the left drive wheel 2a can be changed with use of the left steering lever 15a, and the rotation speed of the right drive wheel 2b can be changed with use of the right steering lever 15b. The rotation speeds of the left drive wheel 2a and the right drive wheel 2b can be changed independently, and a sharp turn can be performed by rotating these drive wheels in opposite directions. Accordingly, this mowing machine is also called a zero-turn mower.

Figure 2:
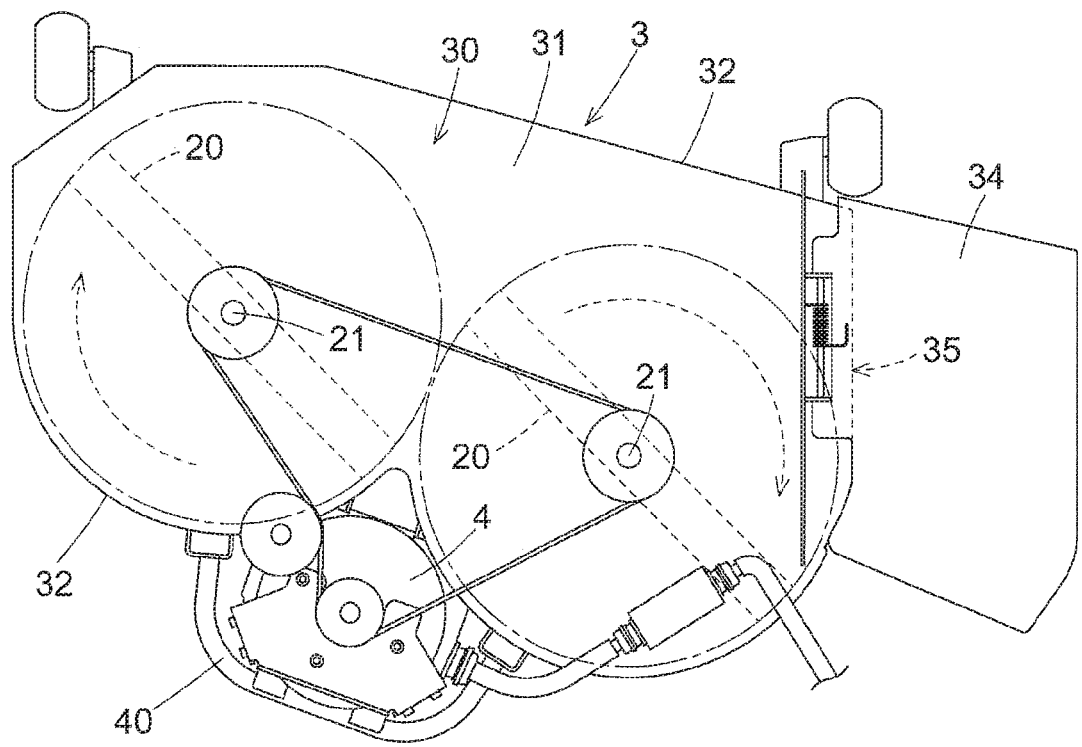
FIG. 2 is a plan view of a mower unit.

As shown in FIG. 2, the mower unit 3 is a side discharge type of mower unit, and includes a mower deck 30 and two rotating cutting blades 20. The left-side cutting blade 20 and the right-side cutting blade 20 are arranged side-by-side in the vehicle body transverse direction. The mower deck 30 includes a ceiling wall 31 and a side wall 32 that extends downward from the outer peripheral edge of the ceiling wall 31. A cut away is formed in a right end region of the side wall 32, thus forming a cut grass discharge opening 35, which is covered by a cover 34. The cutting blades 20 are arranged in the interior space of the mower deck 30 that is formed by the ceiling wall 31 and the side wall 32.

The cutting blades 20 are each shaped as an elongated plate, with cutting edges formed in the two end portions, and wind generating blades formed on the back sides of the cutting edges. The cutting blades 20 are attached to the lower ends of rotation shafts 21 that extend downward through the ceiling wall 31 of the mower deck 30. When mowing is performed, the mowing machine travels while the cutting blades 20 rotate, and the grass cut by the cutting blades 20 is guided to a baffle plate provided inside the mower deck 30 by conveyance wind that is generated by the wind generating blades of the cutting blades 20, then travels through the interior of the mower deck 30, and is discharged laterally outward from the mower deck 30 through the cut grass discharge opening 35. A mower motor 4, which supplies motive power to the cutting blades 20, is mounted to a mounting base 40 that projects horizontally from the side wall 32. Rotational motive power from the mower motor 4 is transmitted to the rotation shafts 21 of the cutting blades 20 by a belt transmission mechanism.

Figure 3:
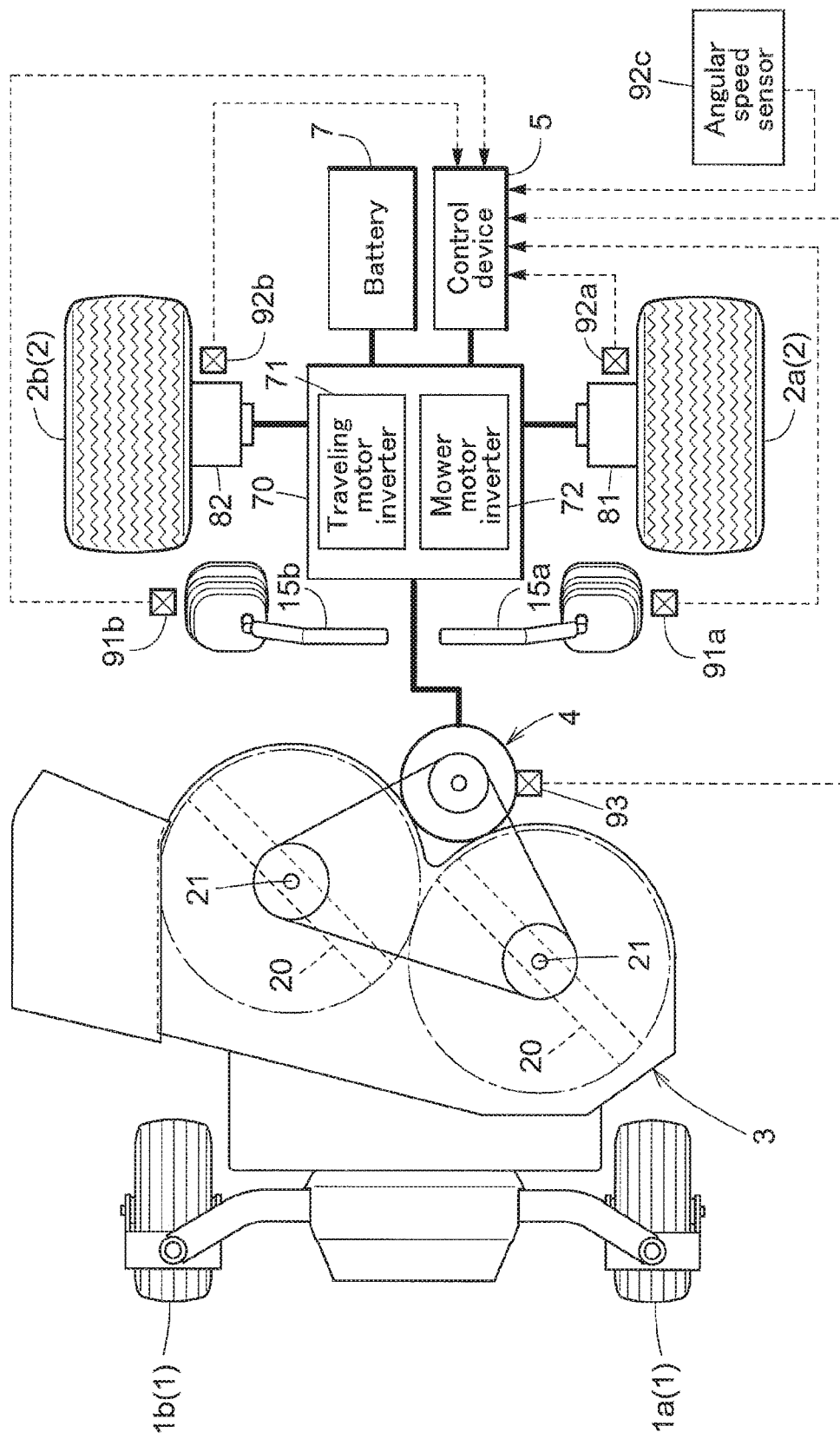
FIG. 3 is a schematic diagram showing a motive power system and a control system of the electric mowing machine.

FIG. 3 shows the motive power system and the control system of the electric mowing machine. An inverter 70 supplies electric power to the mower motor 4 that rotates the cutting blades 20 and a left motor 81 and a right motor 82 that are the traveling motors that respectively rotate the left drive wheel 2a and the right drive wheel 2b. The inverter 70 includes a traveling motor inverter 71 that supplies electric power to the left motor 81 and the right motor 82, and a mower motor inverter 72 that supplies electric power to the mower motor 4. The inverter 70 operates based on control signals from a control device 5. The inverter 70 is connected to the battery 7, which serves as the electric power source.

Figure 4:
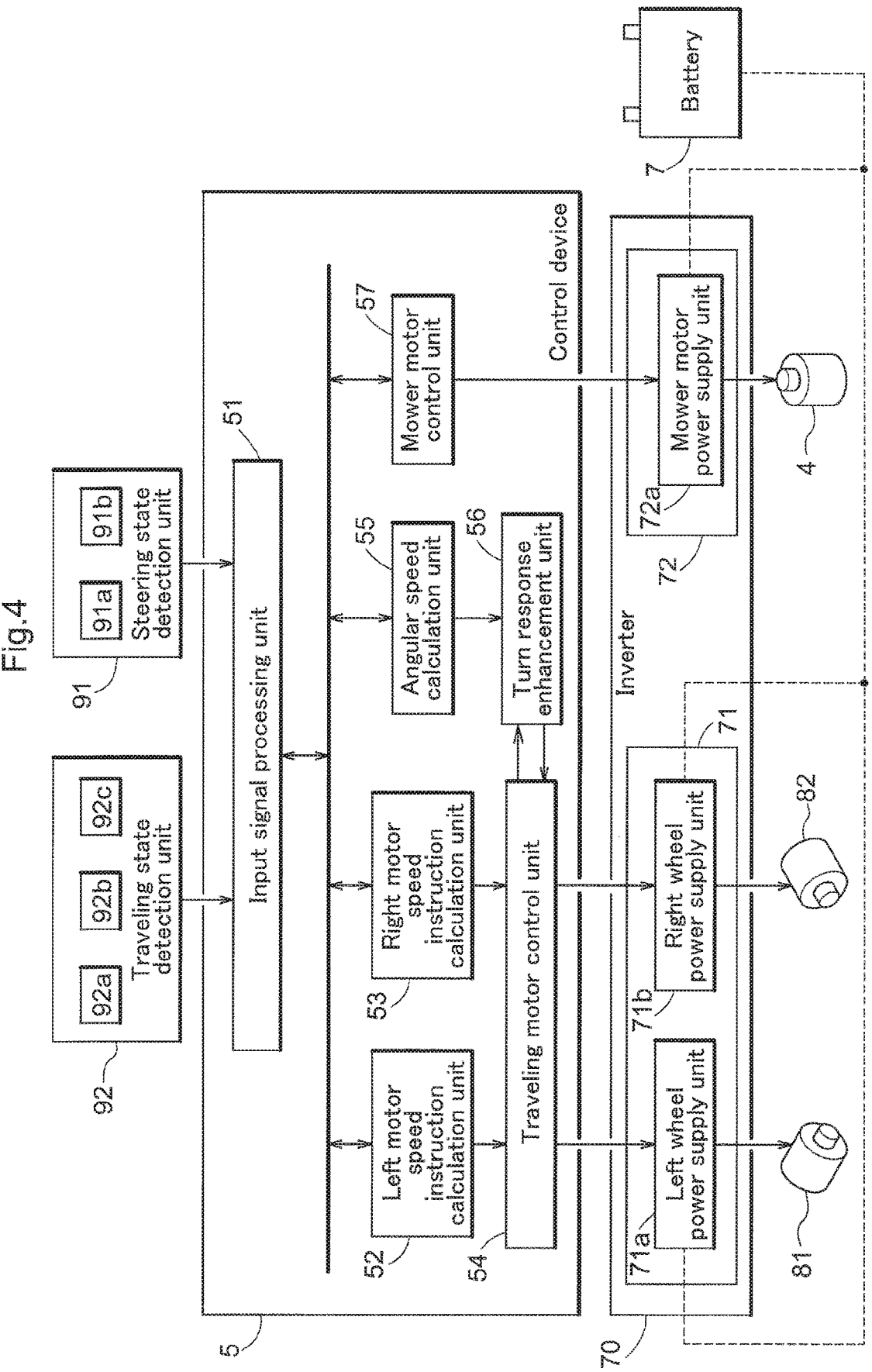
FIG. 4 is a function block diagram of the control system.

As shown in FIG. 4, the control device 5 receives detection signals from a steering state detection unit 91 and a traveling state detection unit 92. The steering state detection unit 91 includes a left steering angle detection sensor 91a and a right steering angle detection sensor 91b. The traveling state detection unit 92 includes a left motor rotation detection sensor 92a, a right motor rotation detection sensor 92b, and an angular speed sensor 92c.

The left steering angle detection sensor 91a detects the swing angle of the left steering lever 15a. The right steering angle detection sensor 91b detects the swing angle of the right steering lever 15b. The left motor rotation detection sensor 92a detects the rotation speed of the left motor 81. The right motor rotation detection sensor 92b detects the rotation speed of the right motor 82. A mower motor rotation detection sensor 93 detects the rotation speed of the mower motor 4. The angular speed sensor 92c is a sensor that detects the yaw angular speed (turning angular speed) of the vehicle body 10, and this detection signal is used to detect the turning state, which is based on steering operations performed on the left steering lever 15a and the right steering lever 15b.

The control device 5 includes an input signal processing unit 51, a left motor speed instruction calculation unit 52, a right motor speed instruction calculation unit 53, a traveling motor control unit 54, an angular speed calculation unit 55, a turn response enhancement unit 56, and a mower motor control unit 57, and these function units are realized by hardware and software. The input signal processing unit 51 has a sensor information processing function and an operation input processing function. The input signal processing unit 51 processes signals from external units such as the traveling state detection unit 92 and the steering state detection unit 91 for conversion into information that can be used in the control device 5.

The left motor speed instruction calculation unit 52 calculates a left motor speed instruction for generating a rotation speed (rotational frequency) for the left drive wheel 2a, that is to say a rotation speed (rotation frequency) for the left motor 81, based on a steering signal from the left steering angle detection sensor 91a that detects the operation amount of the left steering lever 15a set by the driver. Also, the right motor speed instruction calculation unit 53 similarly calculates a right motor speed instruction for generating a rotation speed (rotational frequency) for the right drive wheel 2b, that is to say a rotation speed (rotation frequency) for the right motor 82, based on a steering signal from the right steering angle detection sensor 91b that detects the operation amount of the right steering lever 15b set by the driver.

The traveling motor control unit 54 gives, to the traveling motor inverter 71, a control signal for sending necessary electric power to the left motor 81 and the right motor 82 based on a left motor control instruction for realizing the left motor 81 rotation speed and a right motor control instruction for realizing the right motor 82 rotation speed, which were obtained by the left motor speed instruction calculation unit 52 and the right motor speed instruction calculation unit 53.

Figure 5:
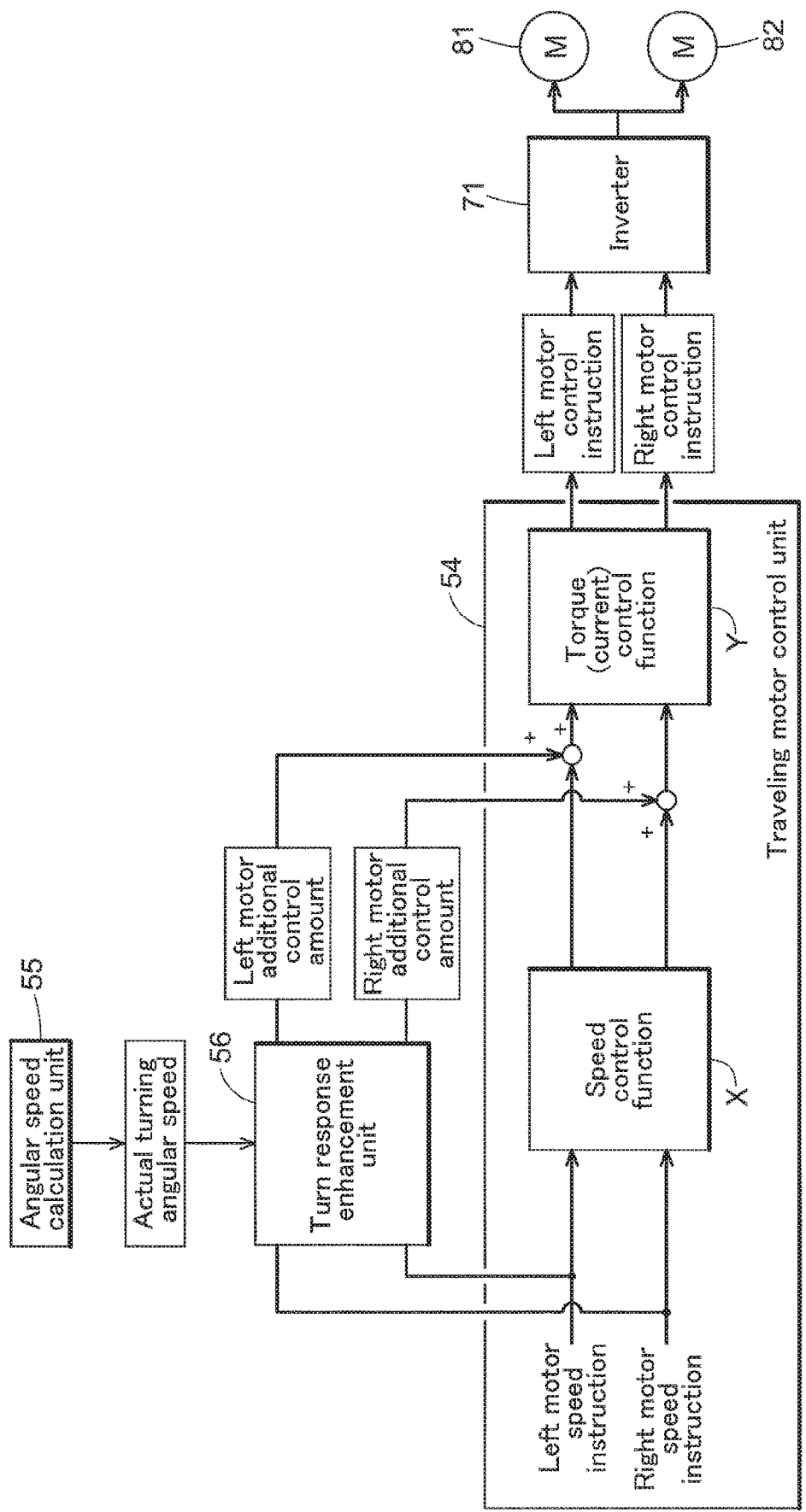
FIG. 5 is a block diagram showing a flow of data in a traveling motor control unit and a turn response enhancement unit.

As shown in FIG. 5, the traveling motor control unit 54 has a speed control function X and a torque (current) control function Y. The speed control function X calculates a left speed control amount based on the left motor speed instruction, and calculates a right speed control amount based on the right motor speed instruction. The left speed control amount and the right speed control amount are control amounts that are calculated in correspondence with the operation amount of the left steering lever 15a and the operation amount of the right steering lever 15b, and are unrelated to straight traveling or turning traveling. The torque (current) control function Y obtains an addition control amount by adding a left motor additional control amount from the turn response enhancement unit 56 to the left speed control amount, and, based on the addition control amount, calculates a left motor control instruction that indicates a torque value or a current value for the left motor 81. The torque (current) control function Y obtains another addition control amount by adding a right motor additional control amount from the turn response enhancement unit 56 to the right speed control amount, and, based on this addition control amount, calculates a right motor control instruction that indicates a torque value or a current value for the right motor 82. During straight traveling, the left motor additional control amount and the right motor additional control amount are not generated, and therefore the traveling motor control unit 54 calculates the left motor control instruction and the right motor control instruction based on only the control amounts from the speed control function X.

The traveling motor inverter 71 includes a left wheel power supply unit 71a and a right wheel power supply unit 71b. The rotation speeds of the left motor 81 and the right motor 82 change according to the amounts of electric power independently supplied thereto by the left wheel power supply unit 71a and the right wheel power supply unit 71b, thus making it possible to set different rotation speeds for the left drive wheel 2a and the right drive wheel 2b, and turning (direction change) of the mowing machine is performed using this difference between the left and right drive wheel speeds.

Upon receiving an operation instruction for instructing the control device 5 to drive the mower motor 4, the mower motor control unit 57 drives the mower motor 4 by controlling the mower motor power supply unit 72a of the mower motor inverter 72.

The angular speed calculation unit 55 calculates the angular speed (yaw rate) of the vehicle body 10 based on a detection signal from the angular speed sensor 92c, and gives the angular speed to the turn response enhancement unit 56 as the actual angular speed.

As shown in FIG. 5, the turn response enhancement unit 56 generates an additional control amount so as to improve the turning response when turning the vehicle body 10. Specifically, when turning is performed, the traveling motor control unit 54 controls the left motor 81 and the right motor 82 with control amounts that are the result of the addition of the additional control amount. Specifically, the turn response enhancement unit 56 outputs a left additional instruction for enhancing the left motor control instruction and a right additional instruction for enhancing the right motor control instruction based on a turn instruction calculated based on the left motor speed instruction and the right motor speed instruction, and gives the left and right additional instructions to the traveling motor control unit 54.

Figure 6:
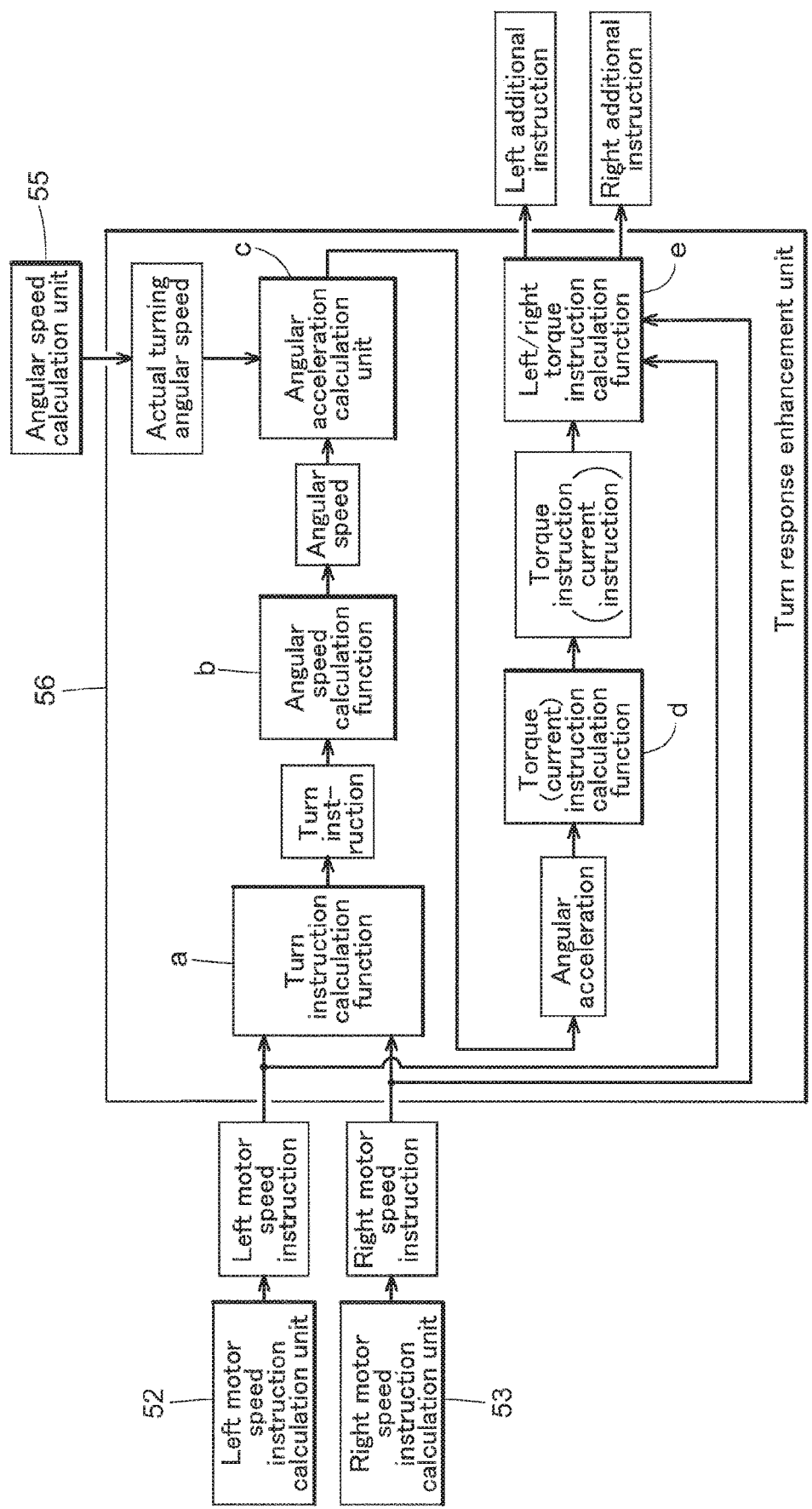
FIG. 6 is a block diagram showing a flow of data in the turn response enhancement unit.

For this reason, as shown in FIG. 6, the turn response enhancement unit 56 includes a turn instruction calculation function a, an angular speed calculation function b, an angular acceleration calculation function c, a torque (current) instruction calculation function d, and a left/right torque instruction calculation function e. The turn response enhancement unit 56 uses the aforementioned functions to output the left additional instruction and the right additional instruction through the following process.

The turn instruction calculation function a calculates a turn instruction based on left and right motor speed instructions. The angular speed calculation function b calculates a turning angular speed based on the turn instruction. The angular acceleration calculation function c calculates a turning angular acceleration using the turning angular speed and the actual turning angular speed from the angular speed calculation unit 55. By using the actual turning angular speed, it is possible to perform feedback control to check whether the angular acceleration indicated by the instruction has been achieved. The torque (current) instruction calculation function d calculates a torque instruction (or current instruction) based on the angular acceleration. The left/right torque instruction calculation function e calculates a left additional instruction and a right additional instruction based on the torque instruction (or current instruction), such that the torque instruction (or current instruction) is distributed between the left motor 81 and the right motor 82 with consideration given to the left and right motor speed instructions.

At least several of the functions included in the turn response enhancement unit 56 can be configured as a lookup table that is created in advance and derives output data based on input data. Also, this lookup table can be configured to be capable of being changed according to the driver or according to the work that is to be performed.

Figure 7:
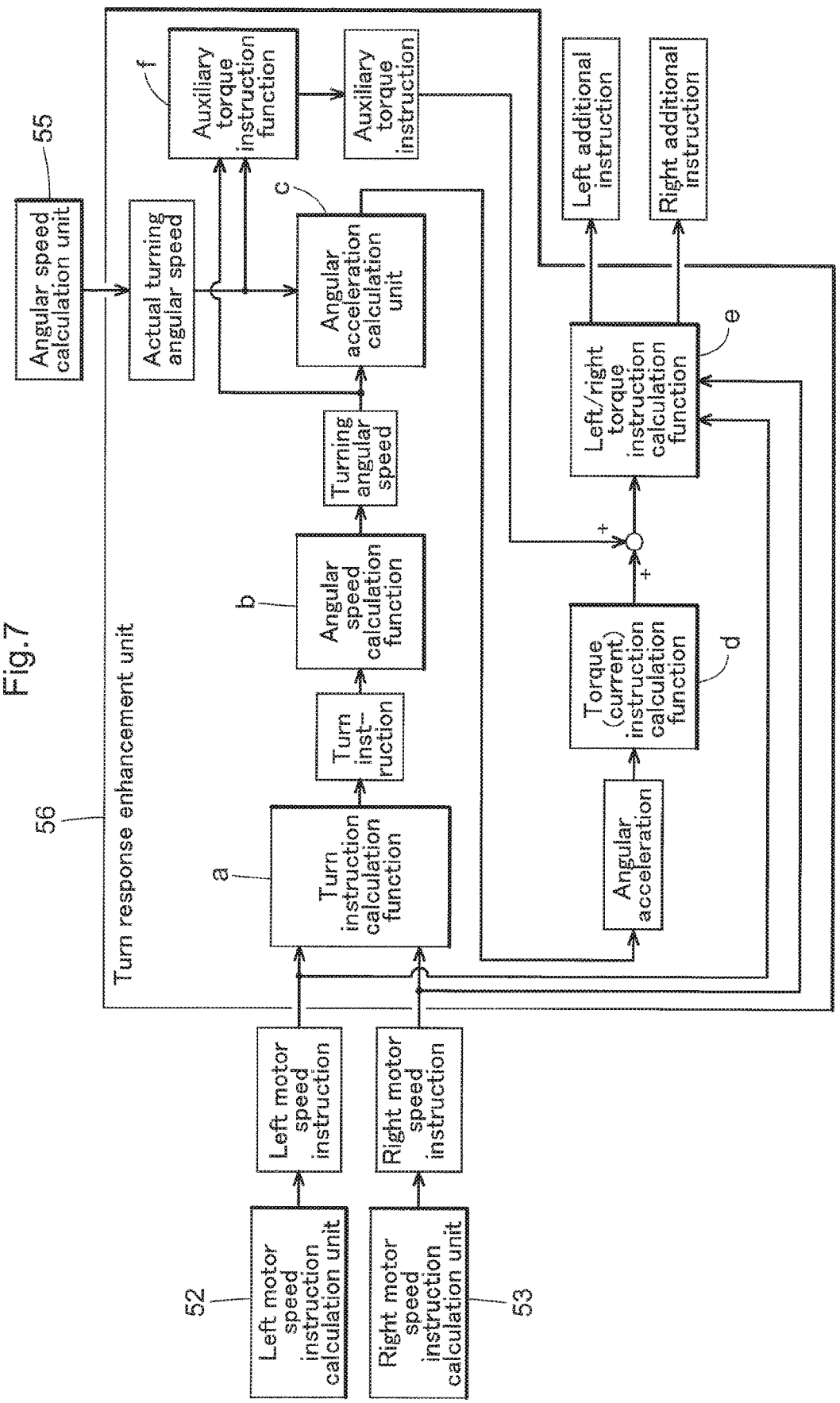
FIG. 7 is a block diagram showing a flow of data in another embodiment of the turn response enhancement unit.

OTHER EMBODIMENTS (1) FIG. 7 shows another embodiment of the turn response enhancement unit 56. This turn response enhancement unit 56 includes an auxiliary torque instruction function f that calculates an auxiliary torque instruction with use of the turning angular speed calculated by the angular speed calculation function b and the actual turning angular speed from the angular speed calculation unit 55. This auxiliary torque instruction is added to the torque instruction calculated by the torque instruction calculation function d. The left additional instruction and the right additional instruction are calculated based on the torque instruction that is the result of this addition.

(2) Note that although the torque instruction calculated by the auxiliary torque instruction function f is added to the torque instruction calculated by the torque instruction calculation function d in FIG. 7, in another embodiment, the turn response enhancement unit 56 may include the turn instruction calculation function a, the angular speed calculation function b, the left/right torque instruction calculation function e, and the auxiliary torque instruction function f, and calculate the left additional instruction and the right additional instruction based on only the auxiliary torque instruction.

(3) Although the steering unit 15 is constituted by the left steering lever 15*a* and the right steering lever 15*b* in the above embodiment, a steering wheel may be employed.

(4) Although the electric work vehicle of the above-described embodiment is a mowing machine, the present invention is applicable to a spraying vehicle, a snow removal vehicle, a transportation vehicle, or the like as well.

(5) The function blocks shown in FIGS. 4 to 7 are divided mainly to simplify the description, and the shown function blocks may be integrated with each other, or individual function blocks may be further divided.

The present invention is applicable to an electric work vehicle that includes a left motor for driving a left drive wheel, a right motor for driving a right drive wheel, and a traveling motor control unit that controls the left motor and the right motor independently.

What is claimed is:

1. An electric work vehicle comprising:
   a vehicle body;
   a left drive wheel and a right drive wheel that are supported to the vehicle body;
   a left motor configured to drive the left drive wheel and a right motor configured to drive the right drive wheel;
   a steering unit configured to steer the vehicle body;
   a traveling motor control unit configured to control the left motor and the right motor independently based on a steering signal from the steering unit; and
   a turn response enhancement unit configured to give, to the traveling motor control unit, an additional control amount for the left motor and the right motor so as to improve turning response during turning of the vehicle body.

2. The electric work vehicle according to claim 1, further comprising:
   a left motor speed instruction calculation unit configured to calculate a left motor speed instruction from the steering signal and a right motor speed instruction calculation unit configured to calculate a right motor speed instruction from the steering signal,
   wherein the traveling motor control unit outputs a left motor control instruction and a right motor control instruction that are generated based on the left motor speed instruction and the right motor speed instruction, and
   the turn response enhancement unit outputs a left additional instruction for enhancing the left motor control instruction and a right additional instruction for enhancing the right motor control instruction, based on a turn instruction calculated based on the left motor speed instruction and the right motor speed instruction.

3. The electric work vehicle according to claim 2, wherein the turn response enhancement unit generates the left additional instruction and the right additional instruction based on a torque instruction calculated based on a turning angular speed calculated from the turn instruction and an actual turning angular speed calculated from a detection signal from an angular speed sensor.

4. The electric work vehicle according to claim 3, wherein the turn response enhancement unit calculates a turning angular acceleration from the turning angular speed and the actual turning angular speed, and calculates the torque instruction from the turning angular acceleration.

5. The electric work vehicle according to claim 3, wherein the turn response enhancement unit calculates an auxiliary torque instruction from the turning angular speed and the actual turning angular speed, and the auxiliary torque instruction is added to the torque instruction.

6. The electric work vehicle according to claim 2, wherein the turn response enhancement unit includes a lookup table that derives the left additional instruction and the right additional instruction based on the turn instruction.

* * * * *